United States Patent
Koide et al.

(10) Patent No.: US 7,286,496 B2
(45) Date of Patent: Oct. 23, 2007

(54) IP NETWORK COMMUNICATION DEVICE WITH FACSIMILE COMMUNICATION FUNCTION

(75) Inventors: Atsuko Koide, Tokyo (JP); Syuusuke Sawai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1032 days.

(21) Appl. No.: 10/251,816

(22) Filed: Sep. 23, 2002

(65) Prior Publication Data

US 2003/0072272 A1    Apr. 17, 2003

(30) Foreign Application Priority Data

Oct. 17, 2001    (JP)    ............................. 2001-319219

(51) Int. Cl.
*H04B 3/20* (2006.01)
*H04J 1/02* (2006.01)
*H04L 12/66* (2006.01)

(52) U.S. Cl. ................. 370/287; 358/400; 358/407; 358/468; 379/100.06; 370/352; 370/493

(58) Field of Classification Search ............... 358/405, 358/435; 370/269, 287, 392; 379/100.06, 379/100.17
See application file for complete search history.

(56) References Cited

U.S. PATENT DOCUMENTS 6,912,209 B1 *   6/2005   Thi et al. ..................... 370/286

6,940,847 B1 *   9/2005   Glitho et al. ............... 370/352

FOREIGN PATENT DOCUMENTS

| JP | 05-304535 | 11/1993 |
|---|---|---|
| JP | 10-224495 | 8/1998 |
| JP | 2000-312265 | 7/2000 |

* cited by examiner

*Primary Examiner*—Chirag G. Shah
(74) *Attorney, Agent, or Firm*—Rabin & Berdo, P.C.

(57) ABSTRACT

IP network communication device which allows facsimile communication conforming to ITU-T recommendation V.34 in the network conforming to ITU-T recommendation T.38. This IP network communication device comprises a call controller for setting the call connection of a voice channel with another communication device, a voice controller which generates packets from voice data and facsimile data, sends the packets to the other communication device, and restores voice data or facsimile data from the packets received from the other communication device, and a digital signal processor which mediates the communication of voice data and facsimile data between an accommodated terminal and the voice controller. The digital signal processor turns ON the facsimile tone detecting function, echo canceling function, and fluctuation absorption buffer function if voice data is communicated, and turns these functions OFF if facsimile data is communicated.

18 Claims, 8 Drawing Sheets

IP NETWORK COMMUNICATION DEVICE WITH FACSIMILE COMMUNICATION FUNCTION

BACKGROUND OF THE INVENTION

1. Field of the Invention

The present invention relates to a technology for performing facsimile communication using such an IP network as the Internet.

2. Description of Related Art

As facsimile communication technology, technology using a telephone network based on circuit switching method and technology using an IP network are known.

A telephone network is a network for performing voice communication. So the data of facsimile communication is also handled so as to conform to the protocol for voice communication. Standards for performing facsimile communication on a telephone network are, for example, ITU-T recommendation V.17 and ITU-T recommendation V.34. ITU-T recommendation V.17 supports communication speeds of 14.4 kbps or less. Whereas the ITU-T recommendation V.34 is a new communication standard, and supports communication speeds of 33.6 kbps or less.

An IP network, on the other hand, is a network using Internet protocol. An IP network can perform both voice communication and data communication. In Internet protocol, facsimile communication is handled as data communication, not voice communication. A known Internet protocol standard is, for example, ITU-T recommendation T.38.

ITU-T recommendation T.38 specifies that facsimile communication conforming to ITU-T recommendation V.17 can be performed, but facsimile communication conforming to ITU-T recommendation V.34 is not considered. In other words, a facsimile device conforming to ITU-T recommendation V.34 cannot perform communication via an IP network. Therefore an IP network can perform only facsimile communication of 14.4 kbps or less, and cannot perform 28 kbps or 32 kbps high-speed facsimile communication. Also in order to connect a facsimile device which supports ITU-T recommendation V.34 to an IP network, the communication board must be exchanged with an ITU-T recommendation V.17 supported communication board.

SUMMARY OF THE INVENTION

It is an object of the present invention to provide a communication device which can perform high-speed facsimile communication in an IP network.

To achieve this, the IP network communication device according to the present invention comprises a call controller for setting the call connection of a voice channel with another communication device, a voice controller which divides voice data or facsimile data into packets, sends the packets to another communication device, and restores the voice data or facsimile data from the packets received from another communication device; and a signal processor which mediates communication of voice data or facsimile data between an accommodated terminal and the voice controller, turns ON the regeneration quality improving function when voice data is communicated, and turns OFF a part or all of the regeneration quality improving function when facsimile data is communicated.

According to the present invention, facsimile communication is performed using a voice channel, so facsimile communication using a high-speed communication standard can be performed regardless the standard of the network.

Also according to the present invention, the signal processor turns OFF a part or all of the regeneration quality improving function when facsimile data is communicated, so the quality of facsimile data communication can be improved.

BRIEF DESCRIPTION OF THE DRAWINGS

Other objects and advantages of the present invention will be described with reference to the following accompanying drawings.

DESCRIPTION OF THE PREFERRED EMBODIMENTS

Figure 1:
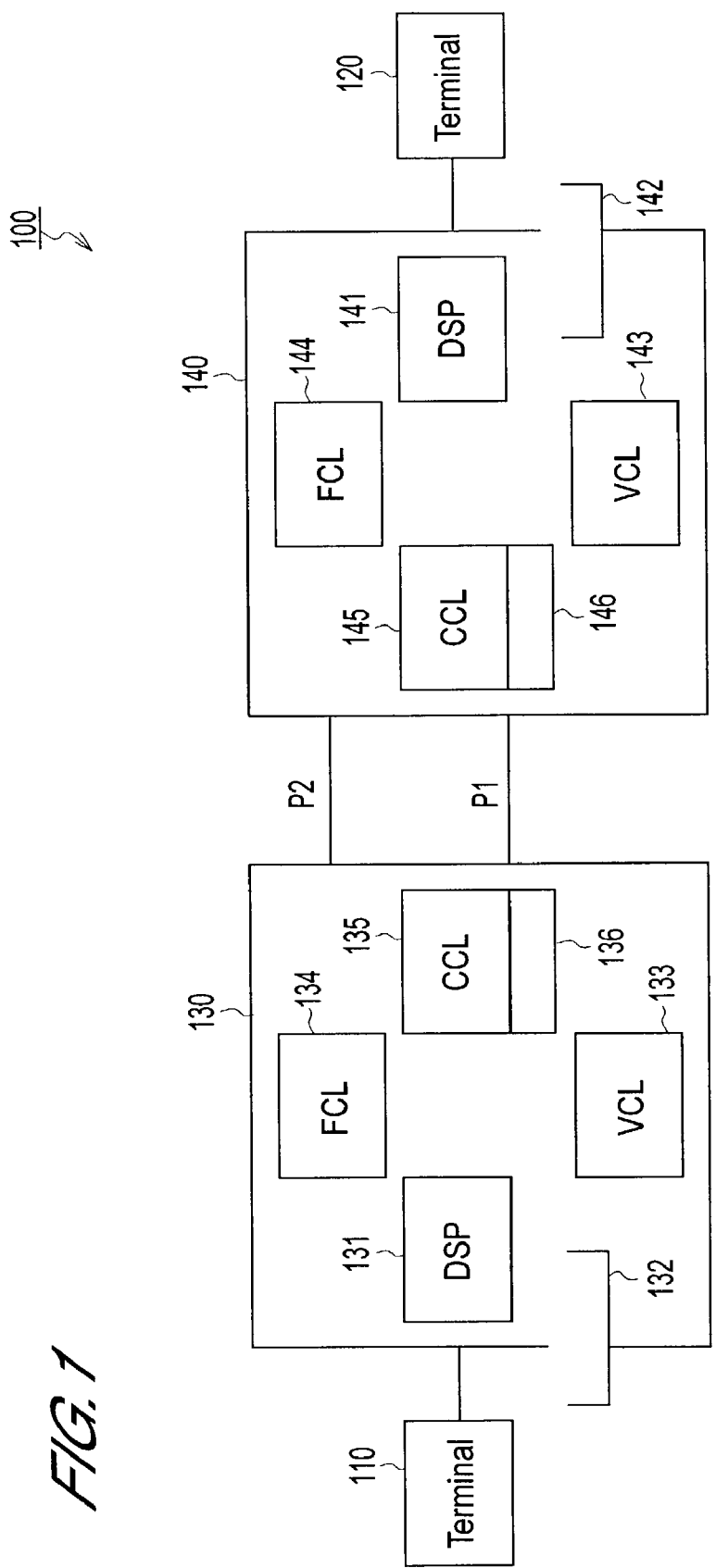
FIG. 1 is a block diagram depicting a configuration of the IP network communication device according to a first embodiment.

Embodiments of the present invention will now be described with reference to the accompanying drawings. In the drawings, the size, shape, and positional relationship of each composing element are generally sufficient to assist in understanding the present invention, and numerical conditions used for the following descriptions are merely examples.

First Embodiment

An IP network communication device according to the first embodiment of the present invention will now be described using FIG. 1 to FIG. 6.

FIG. 1 is a block diagram depicting the general configuration of the network according to the present embodiment.

As FIG. 1 shows, this network 100 is comprised of terminals 110 and 120, and the IP network communication devices 130 and 140. This network 100 is configured so as to conform to ITU-T recommendation T.38.

The terminals 110 and 120 are communication devices having a facsimile communication function or communication devices having a function to relay facsimile communication data. In other words, the terminal devices 110 and 120 are a facsimile device, a telephone with a facsimile function, or a PBX, for example. The terminal 110 is connected to the communication device 130 directly or indirectly. In the same way, the terminal 120 is connected to the communication device 140 directly or indirectly.

The IP network communication devices 130 and 140 create the voice channel P1 and control channel P2 on such an IP network as the Internet. And the communication device 130 and 140 perform voice communication, facsimile communication, and data communication using the channels P1 and P2, where the communication device 130 is comprised of a digital signal processor (DSP) 131, fluctuation absorption buffer 132, voice controller (VCL) 133, facsimile controller (FCL) 134, and call controller (CCL) 135. In the same way, the communication device 140 is comprised of the digital signal processor (DSP) 141, fluctuation absorption buffer 142, voice controller (VCL) 143, facsimile controller (FCL) 144, and call controller (CCL) 145.

The digital signal processors 131 and 141 accommodate the terminals 110 and 120. The digital signal processors 131 and 141 compress/extract voice data, detect facsimile tone, control fluctuation absorption buffers 132 and 142, and control an echo canceller (not indicated in the drawing). Also the digital signal processors 131 and 141 have the function of a facsimile modem. The echo canceller is a function to cancel echo which is generated in the channels connecting the digital signal processors 131 and terminals 110 or in the channels connecting the digital signal processors 141 and terminals 120. The configuration of the digital signal processors 131 and 141 will be described in detail later with reference to FIG. 2.

The fluctuation absorption buffers 132 and 142 temporarily store the voice data received from the voice channel P1, then output this voice data to the terminals 110 and 120 at a predetermined time interval. Also the fluctuation absorption buffers 132 and 142 output silence data to the terminals 110 and 120 when voice data is not stored. By this, the fluctuation of voice data due to the fluctuation of the voice packet receiving interval can be absorbed. The fluctuation absorption buffers 131 and 141 may be configured so as to function also as the above mentioned buffers of the echo canceller.

The voice controllers 133 and 143 generate voice packets from the compressed voice data, which is input from the digital signal processors 131 and 141, and output these voice packets to the voice channel P1. Also the voice controllers 133 and 143 assemble the voice packets received from the voice channel P1 into the compressed voice data, and output the compressed voice data to the digital signal processors 131 and 141. As mentioned later, the voice controllers 133 and 143 perform facsimile communication conforming to ITU-T recommendation V.34 as well as perform voice communication conforming to ITU-T recommendation H.323.

The facsimile controllers 134 and 144 control facsimile communication conforming to ITU-T recommendation T.38, that is ITU-T recommendation V.17, V.29 and V.27 ter. For transmission, the facsimile controllers 134 and 144 convert the facsimile data, which is input from the digital signal processors 131 and 141, into communication packets conforming to ITU-T recommendation T.38, and output the communication packets to the control channel P2. For reception, the facsimile controllers 134 and 144 convert the communication packets, which are input from the control channel P2, into the facsimile data, and output the facsimile data to the digital signal processors 131 and 141.

The call controllers 135 and 145 perform call connection setup processing, that is call sequence control, between the communication devices 130 and 140. The call controllers 135 and 145 have memories 136 and 146 for storing the mode select information. The mode select information is system data which can be configured, and when the voice non-compression mode is selected, a channel to be used for the facsimile communication is selected from the voice channel P1 (in-band) or control channel P2 (out-band) using this mode select information. The call controllers 135 and 145 instruct the digital signal processors 131 and 141 to use the voice channel P1 when facsimile communication in the voice channel P1 (in-band). The mode select information is set when the communication devices 130 and 140 are installed in the network 100.

Figure 2:
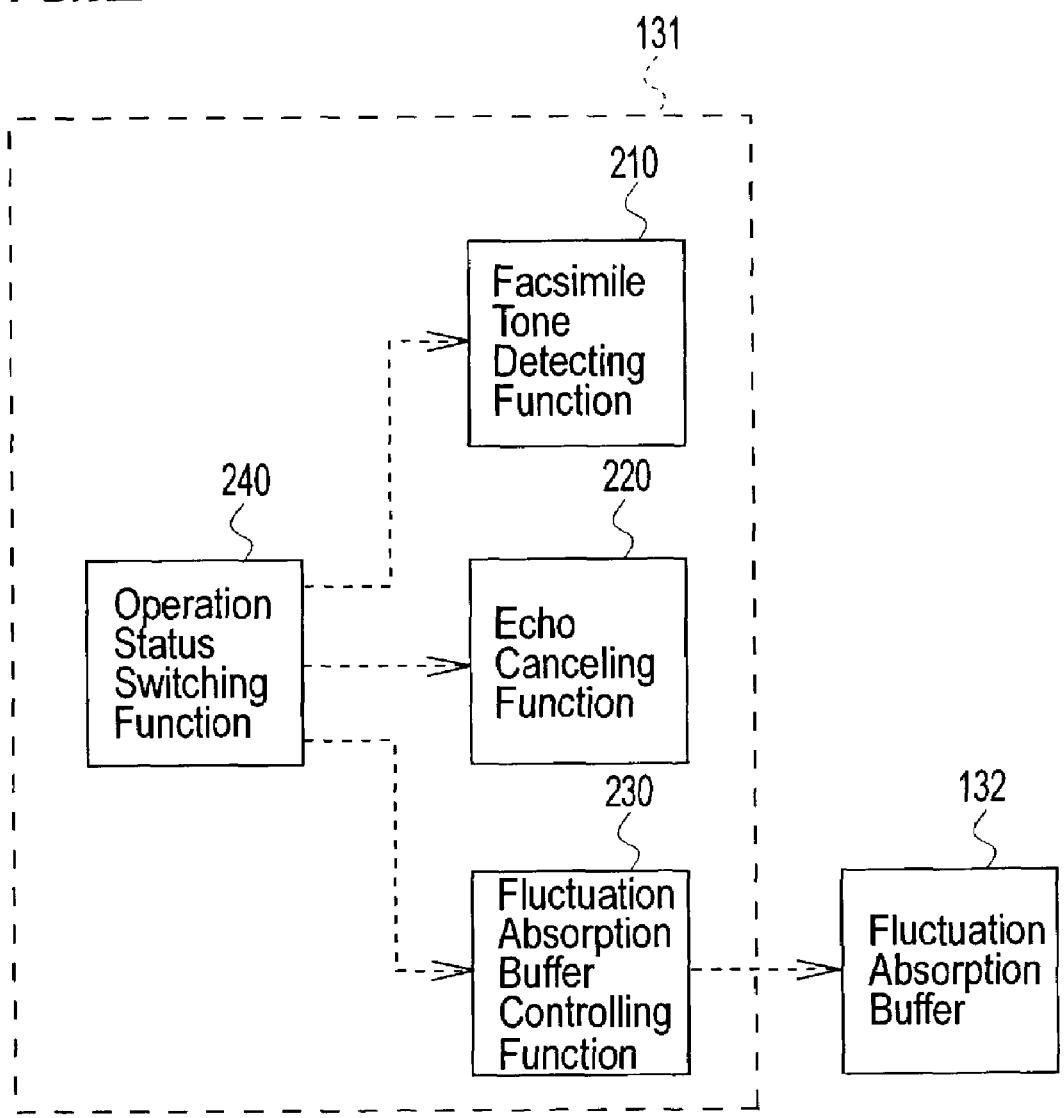
FIG. 2 is a conceptual diagram depicting the function for improving the regenerating voice quality in the digital signal processor shown in FIG. 1.

FIG. 2 is a block diagram depicting a part of the functional configuration of the digital signal processor 131.

As FIG. 2 shows, the digital signal processor 131 is comprised of the facsimile tone detecting function 210, echo canceling function 220, fluctuation absorption buffer controlling function 230, and operation status switching function 240. These functions 210, 220 and 230 are used for improving the quality of regenerated voice.

The facsimile tone function 210 is a function for detecting facsimile tone which is input from the terminal 110 (see FIG. 1). When this function 210 is ON, the digital signal processor 131 detects a facsimile tone. When this function 210 is OFF, on the other hand, the digital signal processor 131 does not detect the facsimile tone. A function linked to this function 210 is a function for suppressing the facsimile tone. When this suppressing function is ON, the facsimile tone detected by the function 210 is not transmitted to the voice controller 133. When the controlling function is OFF, on the other hand, the detected facsimile tone is transmitted to the voice controller 133.

The echo canceling function 220 is a function for executing echo cancellation. When this function 220 is ON, echo cancellation is executed, and when OFF, echo cancellation is not executed.

The fluctuation absorption buffer controlling function 230 is a function for suppressing the fluctuation by controlling the fluctuation absorption buffer 132. When this function 230 is ON, voice data is stored, and silence pattern data is inserted into the fluctuation absorption buffer 132 when necessary. When this function 230 is OFF, voice data is not stored in the fluctuation absorption buffer 132.

The operation switching function 240 is a function to switch ON/OFF the facsimile tone detecting function 210, echo canceling function 220, and fluctuation absorption buffer controlling function 230.

The functional configuration of the digital signal processing 141 is the same as the functional configuration of the digital signal processor 131 shown in FIG. 2.

Now the operation of the IP network communication devices 130 and 140 will be described.

As mentioned above, the network 100 according to the present embodiment is configured so as to conform to ITU-T recommendation T.38. In the ITU-T recommendation T.38, ITU-T recommendation V.17, V.29 and V.27 ter is used as the facsimile communication protocol, and the ITU-T recommendation V.34 is not used. Therefore in the case of a conventional network conforming to ITU-T recommendation T.38, facsimile communication conforming to the ITU-T recommendation V.17, V.29 and V.27 ter can be performed. For the facsimile communication conforming to ITU-T recommendation V.17, V.29 and V.27 ter a control channel is used.

In the case of the communication device 130 and 140 according to the present embodiment, on the other hand, the network 100 conforming to ITU-T recommendation T.38 is used, but facsimile communication conforming to ITU-T recommendation V.34 can be performed. In the present embodiment, facsimile communication conforming to ITU-T recommendation V.34 is performed using the voice channel P1.

Also the communication devices 130 and 140 according to the present embodiment can perform facsimile communication conforming to ITU-T recommendation V.17, V.29 and V.27 ter and voice communication conforming to ITU-T recommendation T.38, just like conventional communication devices.

(1) Facsimile Communication in the Voice Channel (ex. High-speed Facsimile Communication Conforming to ITU-T Recommendation V.34)

Figure 3:
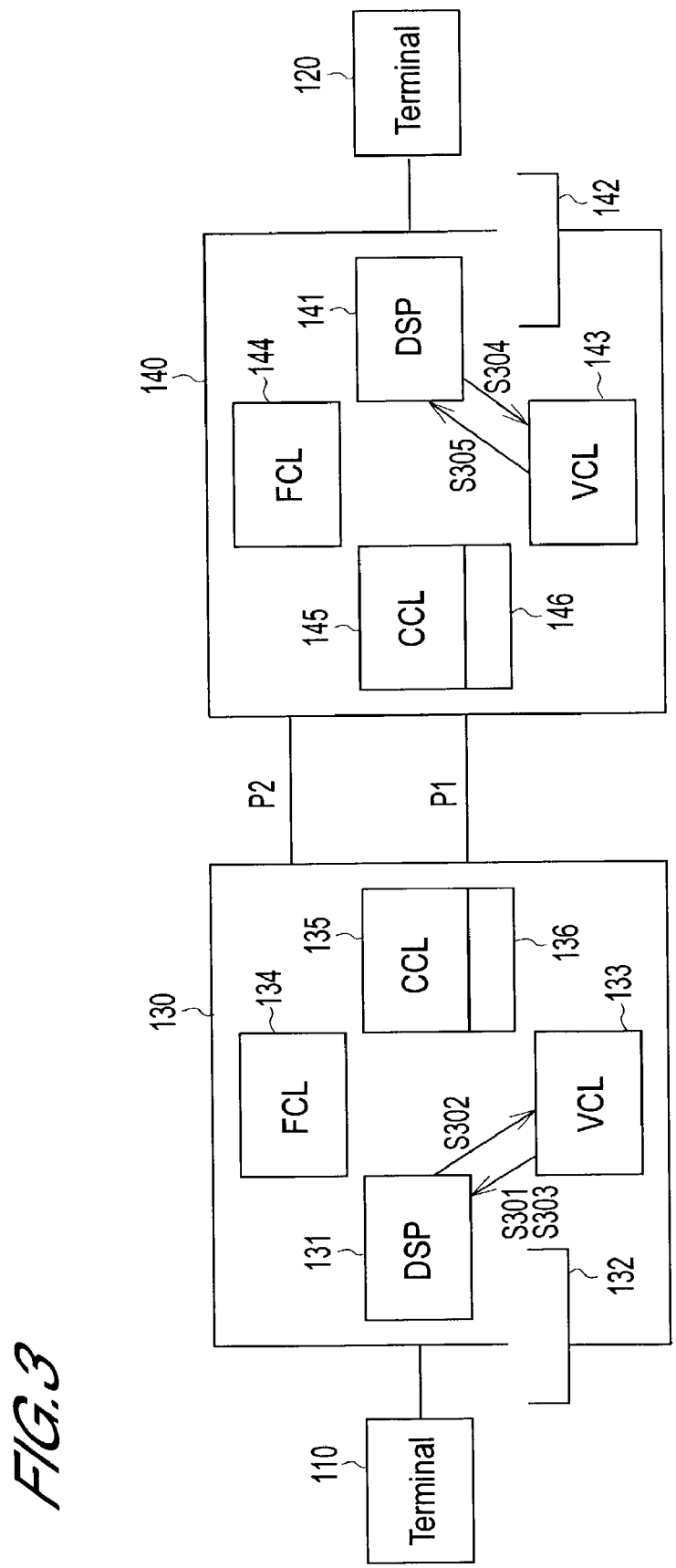
FIG. 3 is a conceptual diagram depicting the high-speed facsimile communication operation of the IP network communication device according to the first embodiment.
Figure 4:
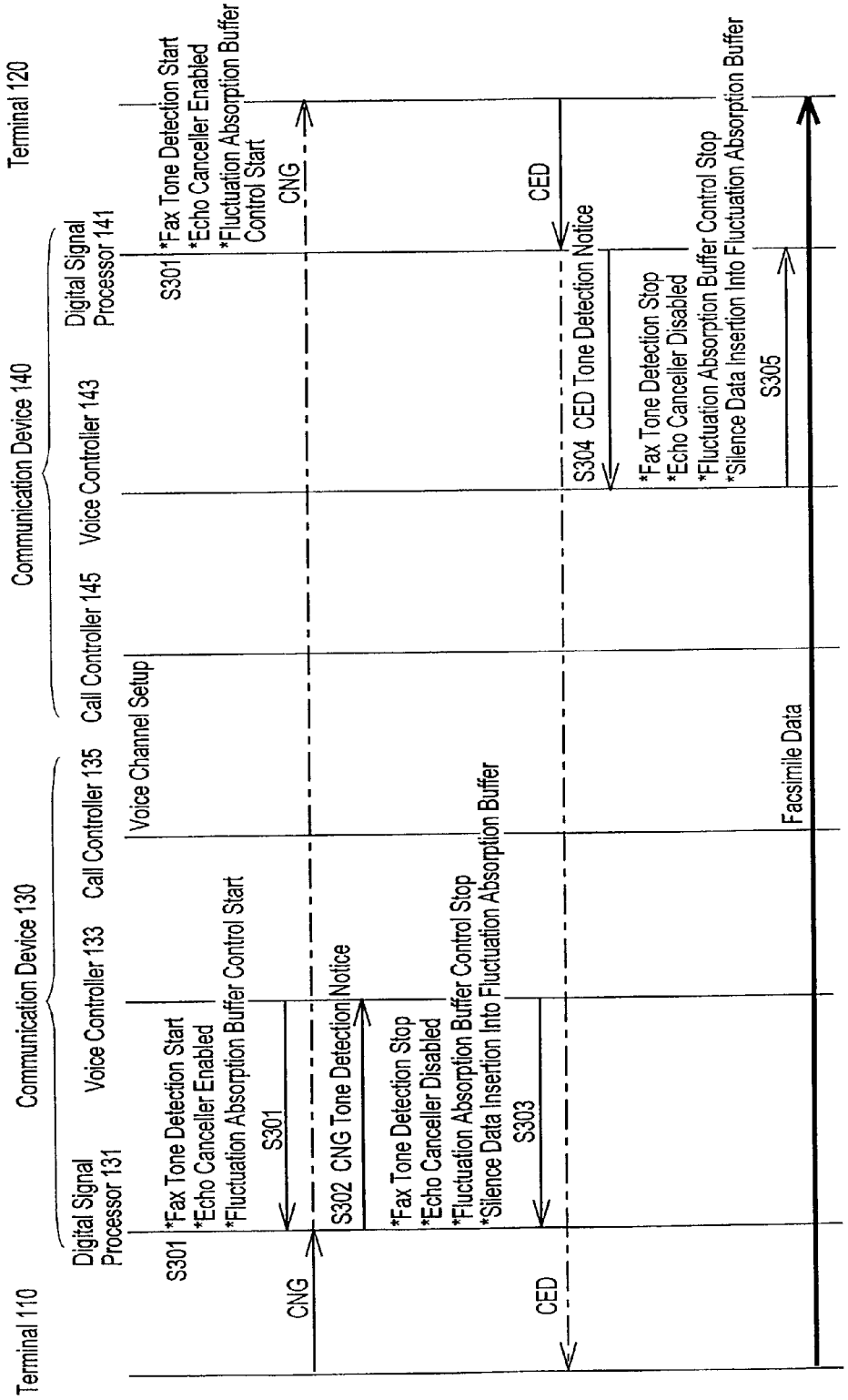
FIG. 4 is a sequence diagram depicting the high-speed facsimile communication operation of the IP network communication device according to the first embodiment.

FIG. 3 and FIG. 4 are diagrams depicting the procedure of facsimile communication in the voice channel P1 (ex. Facsimile communication conforming to ITU-T recommendation V.34) when facsimile data is sent from the terminal 110 to terminal 120.

When the terminal 110 is off hook, and the dial tone of the terminal 120 is input, negotiation is executed between the communication devices 130 and 140 according to a predetermined procedure. For this procedure, the procedure specified in ITU-T recommendation H.323, for example, can be used. In this negotiation, the type of voice compression and other communication condition is set.

If a non-compression system (e.g. ITU-T recommendation G.711) is set as the voice compression system, the voice controllers 133 and 143 check the specifications of the channel to be used for facsimile communication, referring to the mode select information stored in the memories 136 and 146. If the voice channel P1 (in-band) has been specified for facsimile transmission, facsimile communication in the voice channel P1 is performed. In this case, the voice controllers 133 and 143 make the operation status switching function 240 (see FIG. 2) of the digital signal processors 131 and 141 to turn ON the facsimile tone detection function 210, echo canceling function 220 and fluctuation absorption function 230 (see S301). At this time, suppression of facsimile tone is set to OFF. If a compression system (e.g. ITU-T recommendation G.729A) has been specified as the voice compression system, or if the control channel P2 (out bound) has been specified as the channel of facsimile communication, the later mentioned facsimile communication in the control channel P2 is selected.

When the terminal 110 is off hook, the terminal 110 outputs CNG (calling tone). CNG is a facsimile tone for the calling specified in ITU-T recommendation T.30. CNG is detected by the digital signal processor 131. The digital signal processor 131 notifies the voice controller 133 that CNG is detected (see S302). Since suppression of facsimile tone is set to OFF, as mentioned above, this CNG passes through the voice channel P1 and voice controller 143, and reaches the terminal 120.

When the voice controller 133 receives the CNG detection notice, the voice controller 133 instructs the digital signal processor 131 to stop the facsimile tone detecting function 210, to stop the echo canceling function 220, and to stop the fluctuation absorption buffer control 230, and instructs the fluctuation absorption buffer 132 to insert silence pattern data for a predetermined time (e.g. 500 ms) (see S303).

When the terminal 120 receives CNG, the terminal 120 outputs CED (called station identification) to the digital signal processor 141. CED is a facsimile tone for the response specified in ITU-T recommendation T.30. The digital signal processor 141 notifies the voice controller 143 that CED was detected (see S304). Since suppression of the facsimile tone is set to OFF, as mentioned above, this CED passes through the voice channel P1 and voice controller 133, and reaches the terminal 110.

When the voice controller 143 receives the CED detection notice, the voice controller 143 instructs the digital signal processor 141 to stop the facsimile tone detecting function 210, to stop the echo canceling function 220, and to stop and fluctuation absorption buffer control 230, and instructs the fluctuation absorption buffer 142 to insert silence pattern data for a predetermined time (e.g. 500 ms) (see S305).

Some of Group Three facsimile devices do not output CNG or CED. Such facsimile devices can use preamble signals instead of CNG or CED. In other words, when the preamble signal is detected, stopping of the facsimile tone detecting function 210, stopping of the echo canceling function 220, stopping of the fluctuation absorption buffer control 230, and insertion of silence pattern data are instructed.

Then facsimile communication between the terminals 110 and 120 is performed via the voice channel P1. In this facsimile communication, facsimile data, which is output from the terminal 110, is received by the digital signal processor 131. At this time, the above mentioned functions 210, 220 and 230 are maintained as OFF. The digital signal processor 131 sends the facsimile data to the voice controller 133 without compressing it. The voice controller 133 generates packets from the facsimile data, and outputs the packets to the voice channel P1. The voice controller 143 restores the facsimile data from the packets received from the voice channel P1. The restored facsimile data is sent to the digital signal processor 141. The digital signal processor 141 sends the facsimile data to the terminal 120. At this time, the above mentioned functions 210, 220 and 230 are kept OFF. During facsimile communication, response signals are sent from the terminal 120 to the terminal 110. The transmission procedure of these response signals is the same as the procedure when the facsimile data is sent from the terminal 110 to the terminal 120.

(2) Facsimile Communication in the Control Channel (ex. Facsimile Communication Conforming to ITU-T Recommendation V.17, V.29 and V.27 ter)

Figure 5:
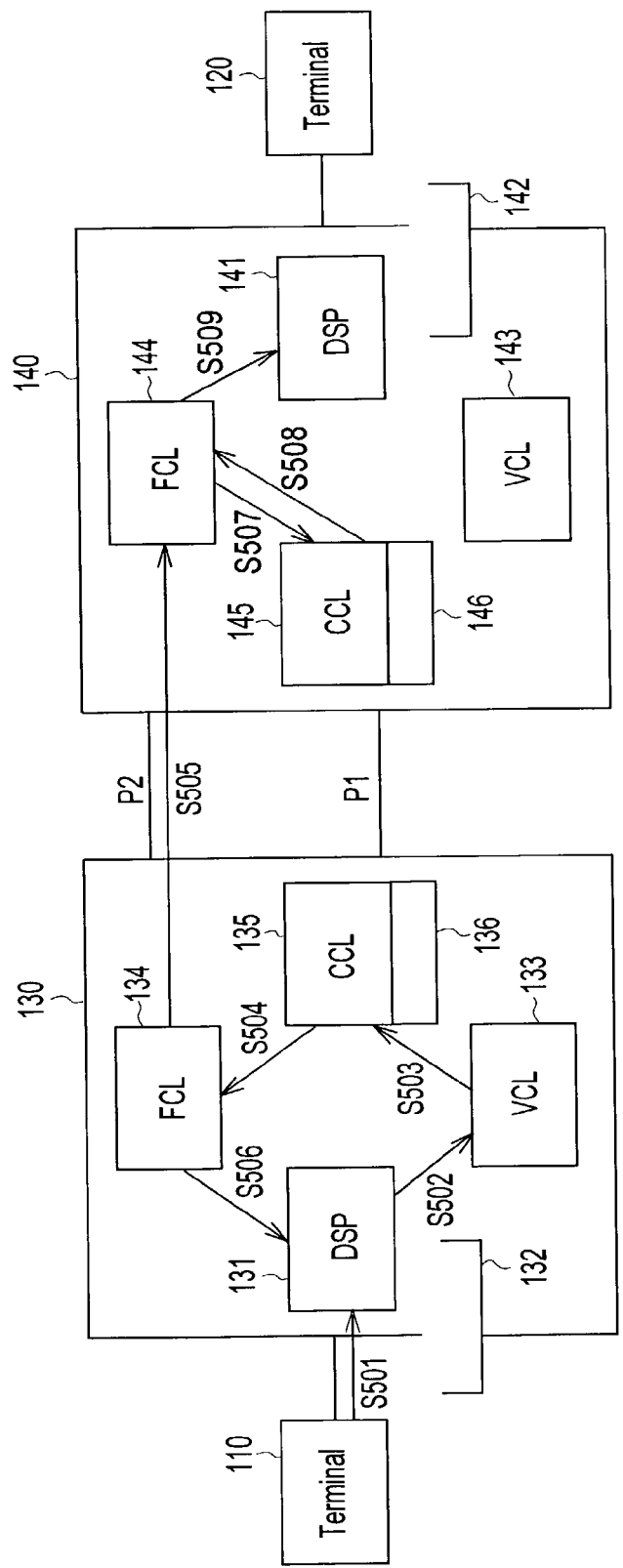
FIG. 5 is a conceptual diagram depicting the facsimile communication operation of the IP network communication device according to the first embodiment.

FIG. 5 is a conceptual diagram depicting the procedure of facsimile communication conforming to ITU-T recommendation V.17 when facsimile data is sent from the terminal 110 to the terminal 120.

As mentioned above, when it is judged that a compression system has been specified as the voice compression system, or when it is judged that the control channel P2 (out-band) has been specified as the channel of facsimile communication during negotiation after off hook, facsimile communication conforming to ITU-T recommendation T.38 in the control channel P2 is selected. The procedure to perform facsimile communication conforming to ITU-T recommendation V.17 in a network conforming to ITU-T recommendation T.38 is specified in ITU-T recommendation H.323. In this facsimile communication, the control channel P2 is used, as described later.

When the facsimile communication in the control channel P2 is started, the facsimile tone detecting function 210, echo canceling function 220, and fluctuation absorbing function 230 are set to ON. The suppression of facsimile tone at this time is set to OFF.

The terminal 110 outputs the facsimile tone to the communication device 130 (see S501). For description here, CED is used as the facsimile tone as an example. This facsimile tone is detected by the facsimile tone detecting function 210 (see FIG. 2) of the digital signal processor 131.

The digital signal processor 131 notifies detection of the facsimile tone to the voice controller 133 (S502). Then the digital signal processor 131 switches the facsimile tone to suppression status. After suppression, the facsimile tone is no longer sent to the voice controller 133. The facsimile tone is suppressed so that the voice controller 133 will not notify the start of the facsimile communication to the voice controller 143 of the communication device 140. This is because if the terminal 120 starts facsimile communication using the voice channel P1 triggered by the notification to the voice controller 143, the voice controller 143 may start facsimile communication in error.

The voice controller 133 notifies detection of the facsimile tone to the call controller 135 (S503). Then the call controller 135 instructs the facsimile controller 134 to start facsimile communication (S504). The facsimile controller 134 sends a facsimile tone detection notice signal to the facsimile controller 144 of the communication device 140 via the control channel P2 (S505). Then the facsimile controller 134 instructs the digital signal processor 131 to switch to the facsimile communication mode (S506).

When the facsimile controller 144 of the communication device 140 receives the communication signal from the control channel P2, the facsimile controller 144 instructs the call controller 145 to switch to the facsimile communication mode (S507). Then the call controller 145 instructs the facsimile controller 144 to start facsimile communication (S508). The facsimile controller 144 instructs the digital signal processor 141 to switch to the facsimile communication mode (S509).

By the above processing, the communication devices 130 and 140 enter the state where facsimile communication can be performed. Then the facsimile data is sequentially transmitted from the terminal 110 to the communication device 130. The communication device 130 generates packets from facsimile data, and sends the packets to the communication device 140 via the control channel P2. The communication device 140 sequentially extracts the received packets, and restores the packets to the facsimile data and sends the data to the terminal 120.

(3) Voice Communication

Figure 6:
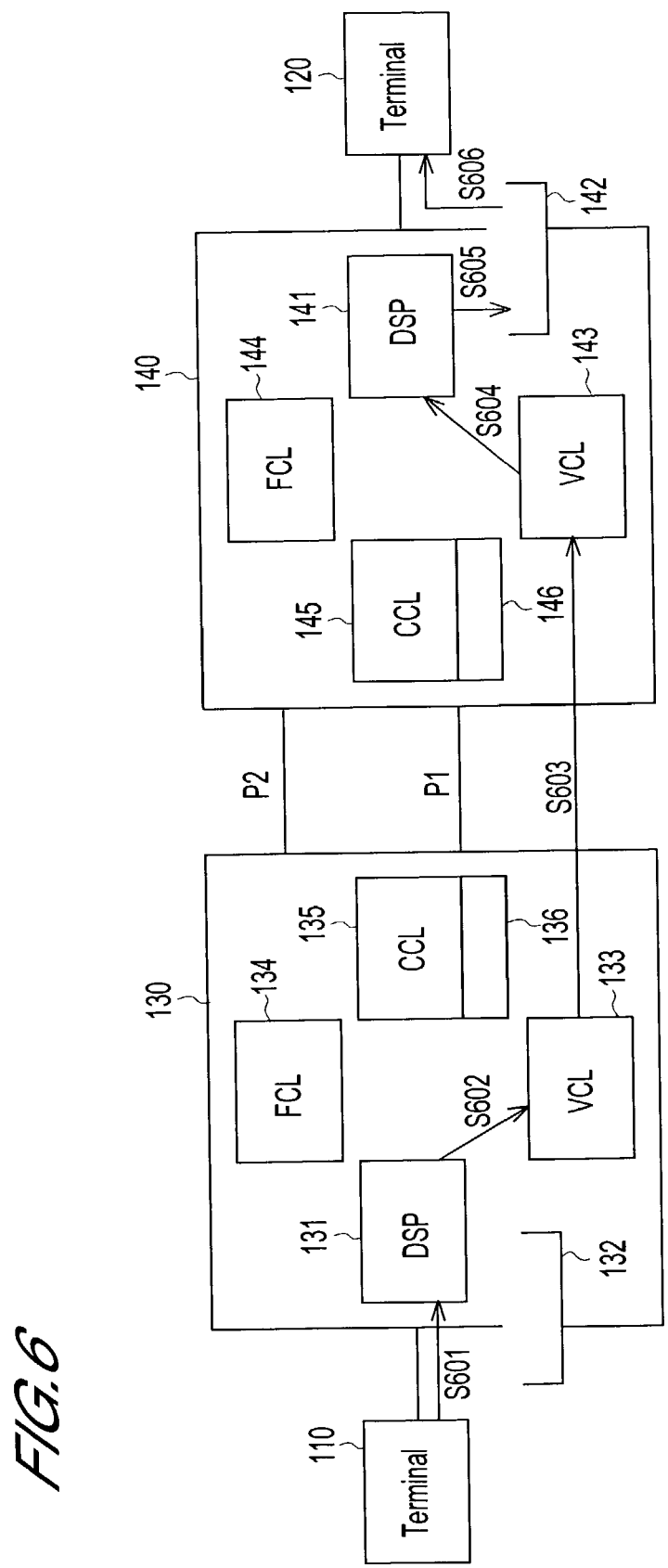
FIG. 6 is a conceptual diagram depicting the voice communication operation of the IP network communication device according to the first embodiment.

FIG. 6 is a conceptual diagram depicting the procedure of voice communication when the voice data is sent from the terminal 110 to terminal 120.

As mentioned above, the network 100 is configured so as to conform to ITU-T recommendation T.38. Therefore this network 100 can perform voice communication conforming to ITU-T recommendation T.38. When voice communication is performed, facsimile tone detecting function 210, echo canceling function 220, and fluctuation absorbing function 230 of the digital signal processors 131 and 141 are set to ON. At this time, suppression of facsimile tone is set to OFF.

At first, voice data is output from the terminal 110. At this time, the generation of echo is suppressed by the echo canceling function 220. This voice data is received by the digital signal processor 131 of the communication device 130 (see S601). The digital signal processor 131 compresses this voice data and sends the compressed voice data to the voice controller 133 (see S602). For the compression system, ITU-T recommendation G729.A, for example, can be used. The voice controller 133 generates voice packets from the compressed voice data which is input from the digital signal processor 131, and outputs the packets to the voice channel P1 (see S603). The packets of the compressed voice data pass through the voice channel P1, and are received by the voice controller 143 of the communication device 140.

The voice controller 143 converts the received packets into compressed voice data, and sends the compressed voice data to the digital signal processor 141 (see S604). If data transmission to the terminal 120 is not in progress, the digital signal processor 141 extracts the received compressed voice data and sends the voice data to the terminal 120. If data transmission to the terminal 120 is in progress, on the other hand, the fluctuation absorption buffer function 230 of the digital signal processor 141 stores the received compressed voice data to the fluctuation absorption buffer 142. And the digital signal processor 141 fetches the compressed voice data from the fluctuation absorption buffer 142 at the end of the data transmission to the terminal 120, extracts the compressed data, and sends the compressed data to the terminal 120.

In this way the voice data transmitted from the terminal 110 is received by the terminal 120.

As mentioned above, according to the present embodiment, facsimile communication conforming to ITU-T recommendation V.34 is performed in a network conforming to ITU-T recommendation T.38 by using the voice channel P1. Also the present embodiment secures high communication quality due to the following reasons.

The echo canceling function 220 improves the communication quality in the case of voice communication, but causes interference with the facsimile modems of the terminals 110 and 120 in the case of facsimile communication. This interference becomes a cause of corrupting facsimile data. In the present embodiment, however, the echo canceling function 220 turns ON when a facsimile tone is transmitted, but turns OFF when the facsimile data is transmitted, so the facsimile data is not corrupted.

The fluctuation absorbing buffers 132 and 142 improve the communication quality in the case of voice communication, but may deteriorate regenerated images in the case of facsimile communication. This is because when the amount of data stored in the fluctuation absorption buffers 132 and 142 is high, the data is partially discarded. In the present embodiment, however, the fluctuation absorption buffer controlling function 230 turns ON when a facsimile tone is transmitted, but turns OFF when the facsimile data is transmitted, so regenerated images are not deteriorated.

Inserting silence pattern data into the fluctuation absorption buffers 132 and 142 improves the communication quality in the case of voice communication, but deteriorates regenerated images in the case of facsimile communication. When the fluctuation absorption buffers 132 and 142 are operating during facsimile communication, silence pattern data is inserted into the fluctuation absorption buffers 132 and 142 if a packet delay occurs on the network. In the present embodiment, however, the fluctuation absorption buffer controlling function 230 turns ON when a facsimile tone is transmitted, but turns OFF when facsimile data is transmitted, so regenerated images are not deteriorated.

Group Three facsimile devices transmit/receive analog format facsimile data. So when Group Three facsimile devices are used as the terminals 110 and 120, the digital signal processors 131 and 141 perform analog/digital conversion of the facsimile data. Therefore if the accuracy of analog/digital conversion do not match between the digital signal processors 131 and 141, silence data is inserted into the fluctuation absorption buffers 132 and 142 due to the mismatch of clock frequencies. As mentioned above, the silence pattern data deteriorates the regenerated images of a facsimile. In the present embodiment, however, the fluctuation absorption buffer controlling function 230 turns ON when a facsimile tone is transmitted, but turns OFF when facsimile data is transmitted, so regenerated images are not deteriorated.

As described above, according to the present embodiment, silence pattern data is inserted into the fluctuation absorption buffers 132 and 142 for a predetermined time (e.g. 500 ms) after the fluctuation absorption buffer controlling function 230 stops. Therefore even if a blank time is generated on the network, due to a packet delay or mismatch of analog/digital conversion accuracy, after the fluctuation absorption buffer controlling function 230 stops, regenerated images are not deteriorated.

Second Embodiment

Now an IP network communication device according to the second embodiment of the present invention will be described with reference to FIG. 7 and FIG. 8.

The present embodiment is an example of an IP network communication device which can perform facsimile communication by action from the reception terminal.

Figure 7:
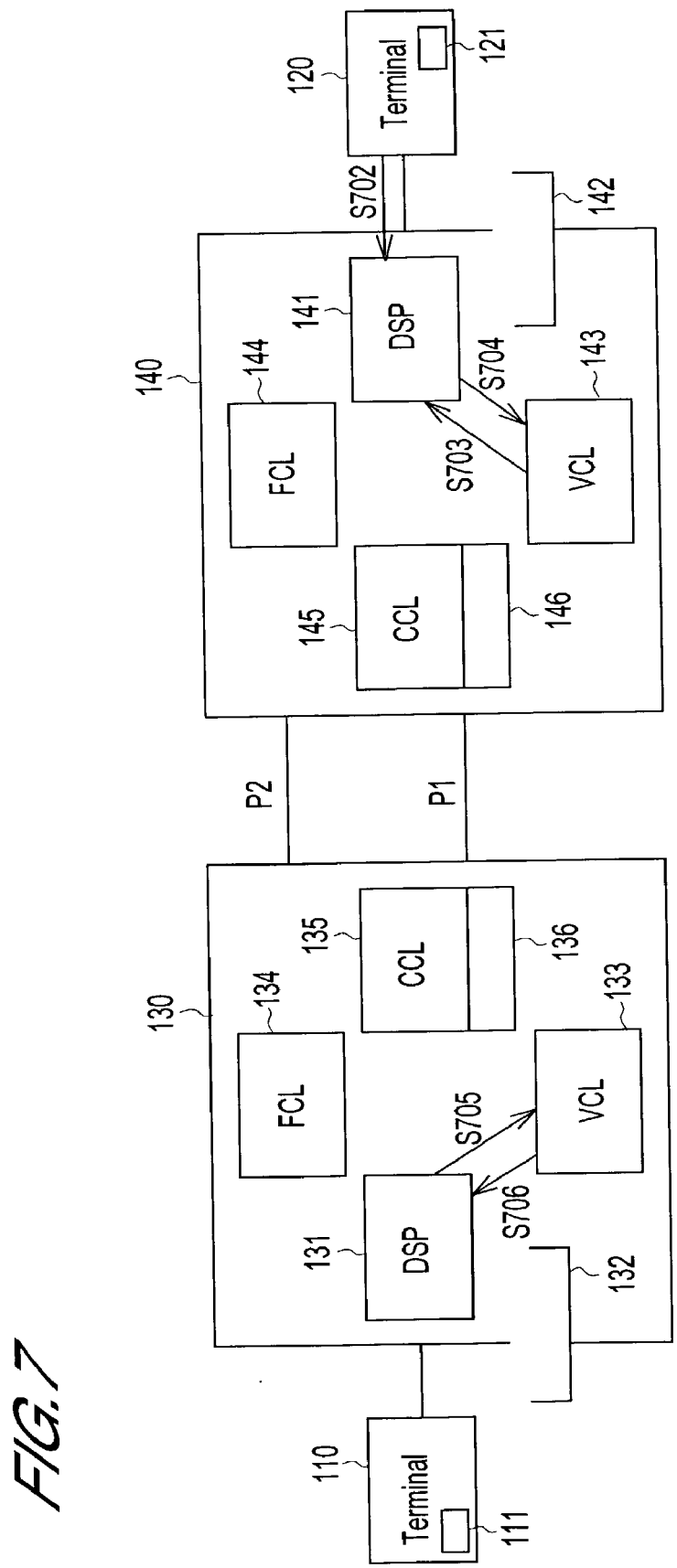
FIG. 7 is a conceptual diagram depicting the high-speed facsimile communication operation of the IP network communication device according to a second embodiment.
Figure 8:
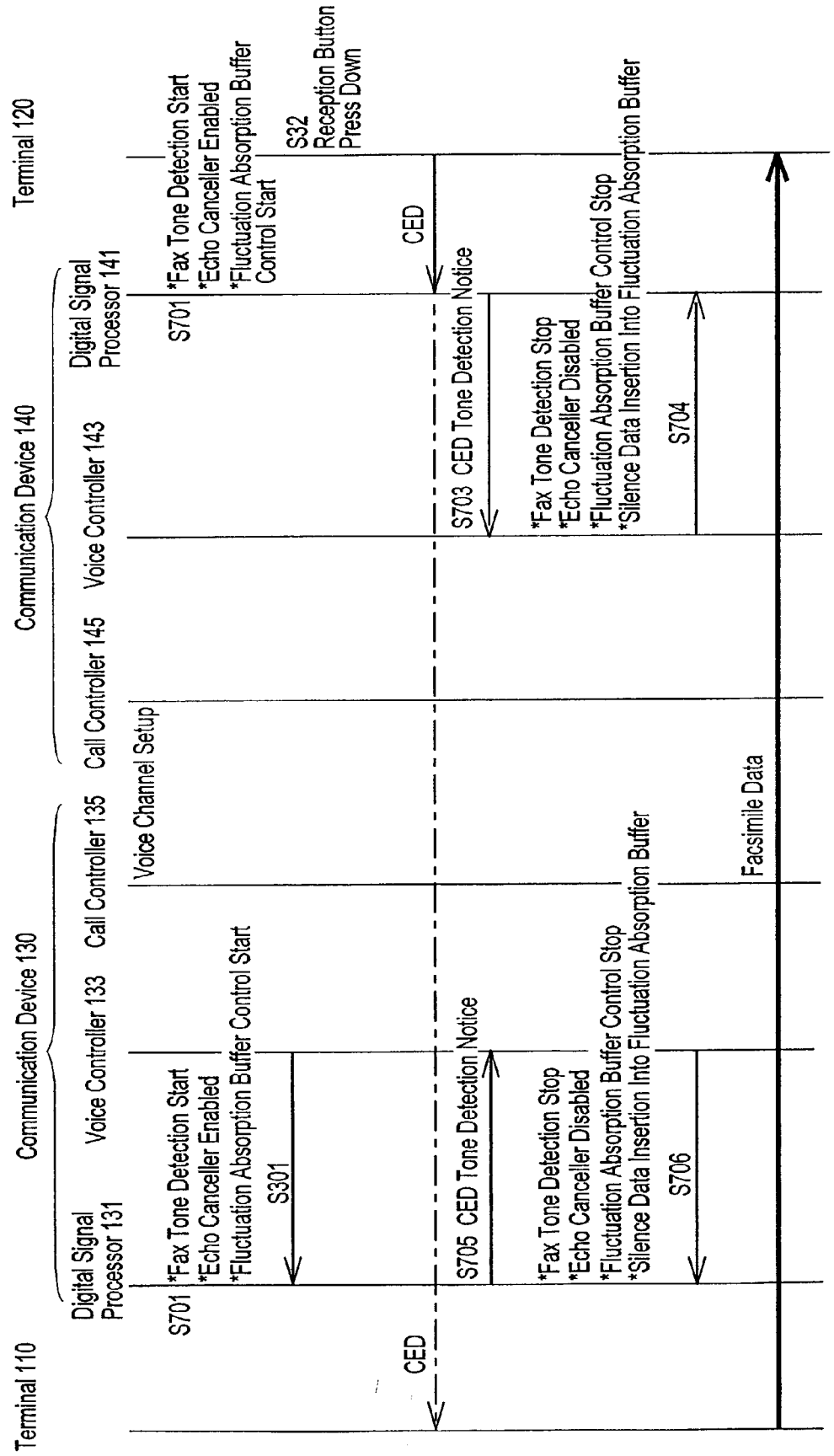
FIG. 8 is a sequence diagram depicting the high-speed facsimile communication operation of the IP network communication device according to the second embodiment.

FIG. 7 is a block diagram depicting the configuration and operation of the IP network communication device according to the present embodiment, and FIG. 8 is a sequence diagram depicting the operation of the IP network communication device according to the present embodiment. In FIG. 7 and FIG. 8, composing elements denoted by the same symbols as FIG. 1 are the same as those in FIG. 1 respectively.

The configuration of the IP network communication device according to the present embodiment is almost the same as the device in FIG. 1. The difference from the IP network communication device according to the first embodiment is that the digital signal processors 131 and 141 have a function to detect a facsimile tone received from the communication path P1, and the terminals 110 and 120 have facsimile reception buttons 111 and 121.

Now the operation of the IP network communication device according to the present embodiment will be described.

When the terminal 110 is off hook and the dial tone of the terminal 120 is input, negotiation is executed between the communication devices 130 and 140, just like the case of the first embodiment. And voice communication or facsimile communication, similar to the first embodiment, is started.

When the voice communication is started, the digital signal processors 131 and 141 turn ON the facsimile tone detecting function 210, echo canceling function 220, and fluctuation absorption buffer function 230. At this time, the tone suppressing function of the facsimile tone detecting function 210 is turned OFF (see S701).

If the facsimile reception button 121 is pushed during voice communication, facsimile communication conforming to ITU-T recommendation V.34 is started as follows.

At first, CED is output from the terminal 120. This CED is input to the digital signal processor 141 (see S702). The digital signal processor 141 notifies the voice controller 143 that CED was detected (see S703). Since suppression of facsimile tone is set to OFF, as mentioned above, this CED passes through the voice channel P1, voice controller 133 and digital signal processor 131, and reaches the terminal 110.

When the voice controller 143 receives the CED detection notice, the voice controller 143 instructs the digital signal processor 141 to stop the facsimile tone detecting function 210, stop the echo cancellation function 220, and stop the fluctuation absorption buffer control 230, and also instructs the digital signal processor 141 to insert a predetermined time (e.g. 500 ms) of silence pattern data into the fluctuation absorption buffer 142 (see S704).

When the digital signal processor 131 receives the CED, on the other hand, the digital signal processor 131 notifies the voice controller 133 that CED was detected (see S705). When the voice controller 133 receives this notice, the voice controller 133 instructs the digital signal processor 131 to stop the facsimile tone detecting function 210, to stop the echo canceling function 220, and to stop the fluctuation absorption buffer control 230, and also instructs the digital signal processor 131 to insert a predetermined time (e.g. 500 ms) of silence pattern data into the fluctuation absorption buffer 132 (see S706).

Then facsimile communication similar to the first embodiment is executed using the voice channel P1.

In this way, the IP network communication device according to the present embodiment enables facsimile communication by action from the reception terminal 120.

As described for the first and second embodiment, the IP network communication device of the present invention enables facsimile communication conforming to ITU-T recommendation V.34 in the network conforming to ITU-T recommendation T.38. In addition, facsimile communication conforming to ITU-T recommendation V.17 can also be performed.

The facsimile communication conforming to ITU-T recommendation V.17 is not essential for the present invention. In other words, the IP network communication device of the present invention may be configured so that only facsimile communication conforming to ITU-T recommendation V.34 is performed.

The present invention may be applied to an IP network communication device which does not have a voice compression function.

A terminal which uses a facsimile tone other than CNG and CED may be used for the IP network of the present invention.

The function which is stopped, triggered by the facsimile tone, is not limited to the above mentioned facsimile tone detecting function 210, echo canceling function 220, and fluctuation absorption buffer function 230. The technical effect of the present invention may be obtained by shutting the other functions to improve the quality of voice communication OFF. The technical effect of the present invention may also be obtained without stopping all these functions 210, 220 and 230. The present invention can also be applied to an IP network communication device which does not have the fluctuation absorption buffers 132 and 142 or the echo canceller.

The technical effect of the present invention may also be obtained by turning the facsimile tone detecting function 210, echo canceling function 220 and fluctuation absorption buffer function 230 OFF only at the reception side IP network communication device.

The first and second embodiments are examples when the present invention is applied to a network which performs voice communication conforming to ITU-T recommendation H.323, but the present invention can be applied to a network which performs voice communication conforming to MGCP (IETF RFC 2705) or SIP (IETF RFC 2543).

What is claimed is:

1. An IP network communication device, comprising:
a call controller for setting a call connection of a voice channel with another communication device;
a voice controller which generates packets from voice data and facsimile data, sends the packets to said other communication device, and restores voice data or facsimile data from the packets received from said another communication device; and a signal processor which mediates communication of voice data and facsimile data between an accommodated terminal and said voice controller, turns ON a regeneration quality improving function if voice data is communicated, and turns OFF a part or all of the regeneration quality improving function if facsimile data is communicated, wherein said regeneration quality improving function is a function to have a fluctuation absorption buffer perform fluctuation absorption, and wherein said signal processor inserts a predetermined time of silence pattern data into the fluctuation absorption buffer when a part or all of said regeneration quality improving function is turned OFF.

2. An IP network communication device, comprising:

a call controller for setting a call connection with another communication device;

a voice controller which communicates voice data and facsimile data with said another communication device using a voice channel;

facsimile controller which communicates facsimile data with said another communication device using a control channel; and a signal processor which mediates communication between an accommodated terminal and said voice controller, mediates communication between said accommodated terminal and said facsimile controller, and comprises a regeneration quality improving function for improving voice quality, wherein said signal processor turns ON said regeneration quality improvement function when said call controller sets the call connection with said another communication device, turns OFF a part or all of the regeneration quality improving function when a facsimile tone is detected and said voice channel is selected, and does not send the facsimile tone to said voice controller when said facsimile tone is detected and said control channel is selected.

3. The IP network communication device according to claim 2, wherein said regeneration quality improving function includes a function to detect the facsimile tone which is output from said accommodated terminal.

4. The IP network communication device according to claim 2, wherein said regeneration quality improving function includes a function to perform echo cancellation.

5. The IP network communication device according to claim 2, wherein said regeneration quality improving function includes a function to have the fluctuation absorption buffer perform fluctuation absorption.

6. The IP network communication device according to claim 5, wherein said signal processor inserts a predetermined time of silence pattern data into the fluctuation absorption buffer when a part or all of said regeneration quality improving function is turned OFF.

7. The IP network communication device according to claim 2, wherein said signal processor turns a part or all of said regeneration quality improving function OFF when a facsimile tone from said accommodated terminal is received.

8. The IP network communication device according to claim 7, wherein said facsimile tone is output from said accommodated terminal by operating a reception button installed on said accommodated terminal.

9. The IP network communication device according to claim 2, wherein said signal processors turns a part or all of said regeneration quality improving function OFF when a facsimile tone from said another other communication device is received.

10. The IP network communication device according to claim 9, wherein said facsimile tone is output from said accommodated terminal by operating a reception button installed on an accommodated terminal of said another communication device.

11. The IP network communication device according to claim 2, wherein said signal processor compresses the voice data received from said accommodated terminal, transfers the compressed voice data to said voice controller, and transfers the facsimile data received from said accommodated terminal to said voice controller without compressing.

12. The IP network communication device according to claim 2, wherein said call controller selects one of voice communication, facsimile communication using a voice channel, and facsimile communication using said control channel based on the execution/non-execution of data compression and the specified channel.

13. The IP network communication device according to claim 2, wherein said voice channel conforms to ITU-T recommendation T.38.

14. The IP network communication device according to claim 2, wherein said facsimile data communication conforms to ITU-T recommendation V.34.

15. The IP network communication device according to claim 2, wherein said facsimile data communication by said facsimile controller conforms to ITU-T recommendation V.17, V.29 and V.27 ter.

16. The IP network communication device according to claim 2, wherein said voice communication conforms to ITU-T recommendation H.323.

17. The IP network communication device according to claim 2, wherein said voice communication conforms to MGCP.

18. The IP network communication device according to claim 2, wherein said voice communication conforms to SIP.

* * * * *